United States Patent Office 2,849,437
Patented Aug. 26, 1958

2,849,437
NEW MONOAZO DYESTUFFS

René de Montmollin, Neu-Allschwil, and Heinrich Zollinger, Binningen, Switzerland, assignors to Ciba Limited, Basel, Switzerland, a Swiss firm No Drawing. Application December 16, 1955
Serial No. 553,437

Claims priority, application Switzerland
December 30, 1954

10 Claims. (Cl. 260—196)

This invention provides new monoazo-dyestuffs which like, for example, the product of the formula (1)
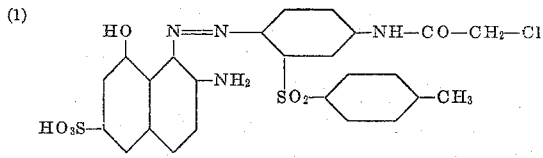

correspond to the general formula (2)    R—N=N—R₁—NH—CO—Z
                  |
                  X in which R represents the radical of a 2-amino-naphthalene sulfonic acid bound in the 1-position to the azo linkage, R₁ represents a benzene radical, Z represents an aliphatic radical bound in α-position to the —CO— group and containing a halogen atom, advantageously in α- or ω-position, and X represents a functionally converted sulfonic acid group, advantageously a group of the formula —SO₂—Y wherein Y represents an aryl group or an N-aryl-alkyl amino grouping.

The invention also provides a process for the manufacture of the monoazo-dyestuffs of the above general formula, wherein a diazo-compound of an amino-sulfone or amino-sulfonic acid amide of the formula (3)    H₂N—R₁—NH—CO—Z
                |
                X in which the symbols have the meanings given above, is coupled with a 2-aminonaphthalene sulfonic acid in an acid medium.

As coupling components there may be mentioned 2-amino-naphthalene sulfonic acids containing a secondary or primary amino group in the 2-position, such as 2-aminonaphthalene-3:6- or 5:7-disulfonic acid, and especially 2-aminonaphthalene mono-sulfonic acids such as 2-amino-3- or -5-hydroxynaphthalene-7-sulfonic acid, 2-amino-7-hydroxynaphthalene-4-sulfonic acid, and also 2-alkylamino-8-hydroxynaphthalene-6-sulfonic acids, for example, 2-methylamino-8-hydroxynaphthalene-6-sulfonic acid, 2-aminonaphthalene-7- or -6-sulfonic acid and advantageously 2-amino-8-hydroxynaphthalene - 6 - sulfonic acid itself.

The amino-sulfones and amino-sulfonic acid amides of the Formula 3 used as starting materials in the present process, are new. They can be obtained, for example, by monoacylating the corresponding diamino-sulfones or diamino-sulfonic acid amides of the formula (4)    H₂N—R₁—NH₂
              |
              X with a halide or the anhydride of an acid of the formula (5)    HOOC—Z more unitary acylation products generally being obtained with the anhydrides. As examples of suitable acylating agents there may be mentioned: α- or β-chloropropionic acid chloride, chloracetyl chloride and chloro- or bromopropionic anhydride and chloracetic anhydride. The reaction of the aforesaid amines with the carboxylic acid chlorides or anhydrides may be carried out in water and/or in the presence of an organic solvent, if desired, with the addition of an acid-binding agent or a buffer such as sodium carbonate, magnesium oxide, calcium carbonate, pyridine or sodium acetate. The diamino-sulfonic acid amides are preferably acylated with the anhydrides, whereas the diamino-diaryl sulfones can usually be acylated in a satisfactory manner with the carboxylic acid chlorides.

The acylation is advantageously carried out in the cold, for example, within the range of −10° C. to +10° C. in a weakly acid medium of pH value 3 to 6 and with an excess of the acylating agent, that is to say, a quantity which is scarcely greater than that which is necessary to react with the amino group which is to be acylated.

The diamines of the Formula 4 may contain as the radical Y an aryl radical, for example, a substituted or unsubstituted phenyl radical such as a methylphenyl, chlorophenyl or methoxyphenyl radical, or the radical of a secondary amine, for example, an N-ethyl-phenyl-amino or N-methyl-chlorophenylamino group. As examples of amino-sulfones and amino-sulfonic acid amides, which can be obtained from these diamines by the methods described above, there may be mentioned: 2-amino-5-(α- or β-chloropropionylamino)-4'-methoxy-1:1'-diphenyl sulfone, 2-amino-5-(chloracetylamino)-1:1'-diphenylsulfone and especially 2-amino-5-(chloracetylamino)-4'-methyl-1:1'-diphenyl sulfone, and also 2-amino-5-(bromacetylamino) - benzene-1-sulfonic acid dimethylamide or diethylamide and 2-amino-5-(chloracetylamino)-benzene-1-sulfonic acid - N - ethyl - phenyl-amide.

These amino-sulfones and amino-sulfonic acid amides can be diazotized by the methods customarily employed for compounds which are difficult to diazotize, for example, by very finely pasting them with water, advantageously with the addition of a suitable wetting agent and/or with the addition of an organic solvent miscible with water.

The diazotized amino-sulfones or amino-sulfonic acid amides are coupled with the 2-aminonaphthalene sulfonic acids in an acid medium, for example, a medium which is weakly acid to Congo to an acetic acid medium. For example, the 2-aminonaphthalene sulfonic acid to be used may first be converted into an alkali metal salt thereof and reconverted into the free acid by the addition of acetic acid, whereby a suspension is obtained, and then coupling with the diazo-compound is carried out in the suspension. The free mineral acid liberated by the coupling reaction is then partially neutralized with sodium acetate and, if desired, the temperature is raised somewhat. The coupling mixture is then worked up in the usual known manner, for example, by neutralization with sodium carbonate, care being taken that the halogen substituent in the radical Z is not split off, and then the product being filtered off and dried.

Among the new dyestuffs of the above general Formula 2 those which correspond to the formula

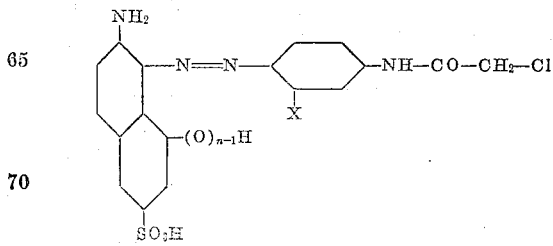

in which $n$ represents the whole number 1 or 2 and $X$ has the meaning given above in connection with Formula 2, are especially valuable. These dyestuffs are constitutionally and from the standpoint of dyeing comparable with the known dyestuffs of the formula

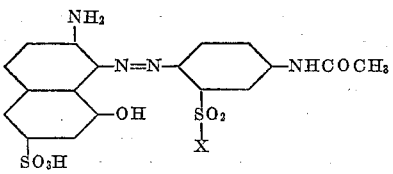

in which $X$ represents an ethyl-phenylamine radical or a para-toluene radical, and of the formula

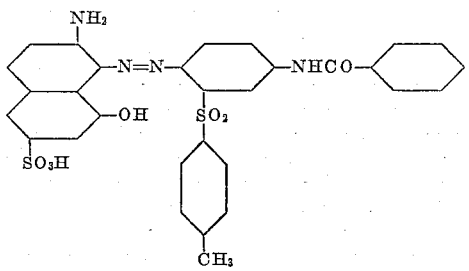

(see, for example, U. S. Patent No. 1,840,385 and U. S. Patent No. 2,505,268). However, the dyestuffs of the present invention possess markedly better properties of wet fastness and their fastness to light is at least equal to or excels that of the above known dyestuffs. They are suitable for dyeing and printing a very wide variety of materials, especially those of animal origin such as leather, silk and above all wool, and also various artificial fibers, for example, animalized artificial silk, superpolyamides and superpolyurethanes etc. The dyeings produced with these dyestuffs are distinguished by their valuable tints and their good properties of fastness.

The following examples illustrate the invention, the parts and percentages being by weight unless otherwise stated, and the relationship of parts by weight to parts by volume being the same as that of the kilogram to the liter:

*Example 1*

338.5 parts of 2-amino-5-chloracetylamino-4'-methyl-1:1'-diphenylsulfone are very finely pasted with 1800 parts of water in a roller mill. The paste is then diluted with 1200 parts of water, 250 parts by volume of hydrochloric acid (density equals 1.15) are added, the mixture is cooled to 0–5° C., and then 250 parts by volume of a 4 N-solution of sodium nitrite are run in. After 24 hours the nitrite reaction has practically disappeared. Acetone may be added in order to accelerate the diazotization.

226 parts of 2-amino-8-hydroxynaphthalene-6-sulfonic acid and 73 parts of sodium 1:3:6-naphthalene trisulfonate are suspended in 2400 parts of water at 60–70° C., and the mixture is neutralized with concentrated caustic soda solution until it is very nearly acid to litmus. The solution is heated to 70–80° C. and poured into the diazo-suspension while stirring. The temperature of 30–35° C., which is attained after mixing the components, is maintained for 24 hours. When the addition of the 2-amino-8-hydroxynaphthalene-6-sulfonic acid is complete, the solution of 140 parts of crystalline sodium acetate in 300 parts of warm water, which has been rendered weakly acid to litmus with acetic acid, is added very slowly to the coupling mixture. When the coupling is finished, about 200 parts of calcined sodium carbonate are added to the dyestuff suspension at room temperature until the reaction is weakly alkaline to Brilliant Yellow and filtered. The press cake so obtained is dried in vacuo at 50–60° C.

There is obtained, as dark red powder the dyestuff of the formula

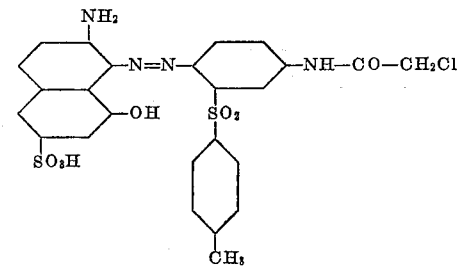

which dissolves in water, and dyes wool in an acid medium bluish red tints having good properties of wet fastness and a very good fastness to light.

The 2 - amino - 5 - chloracetylamino-4'-methyl-1:1'-diphenylsulfone can be obtained, for example, as follows:

398 parts of 2:5-diamino-4'-methyl-1:1'-diphenyl sulfone are dissolved in 1200 parts of water and 900 parts of glacial acetic acid, while warm, and the solution is cooled to 0° C. After the adidtion of 410 parts of crystalline sodium acetate, there are added, while stirring, in the course of about 1 hour 186 parts of chloracetyl chloride dissolved in 200 parts of toluene. The whole is stirred for 30 minutes and 3200 parts of water are introduced dropwise in the course of 30 minutes, and then the mixture is stirred for a further 30 minutes and filtered. The residue is washed with a large quantity of water at 30–40° C. and dried in vacuo at 80–90° C. There are obtained 470–480 parts of a pale grey powder having a violet tinge, which contains 70–75 percent of 2-amino-5-chloracetylamino-4'-methyl-1:1'-diphenyl sulfone. The purified product melts at 170–171° C.

An alternative procedure is as follows:

394 parts of 2:5-diamino-4'-methyl-1:1'-diphenyl sulfone are dissolved in 4000 parts of hot ethyl acetate, the solution is cooled to 0° C. and, while stirring, 269 parts of chloracetic anhydride dissolved in 500 parts of ethyl acetate are added dropwise, care being taken that the temperature does not exceed 5° C. When all the anhydride has been added, the mixture is stirred for a further hour at 0–5° C., then filtered to remove the precipitated 2-amino-5-chloracetylamino-4'-methyl-1:1'-diphenyl sulfone and the filter residue is washed with 500 parts of ethyl acetate at 0–5° C. The acylated product is suspended in 4000 parts of water at 30° C., then filtered off and dried in vacuo at 60° C. There are obtained 430 parts of a crystalline product which melts at 169–171° C.

*Example 2*

338.5 parts of 2-amino-5-chloracetylamino-4'-methyl-1:1'-diphenyl sulfone are diazotized as described in Example 1, and the diazo-compound so obtained is coupled in the manner described in Example 1 with 223 parts of 2-aminonaphthalene-6-sulfonic acid. There is obtained, as orange-red powder, the dye stuff of the formula

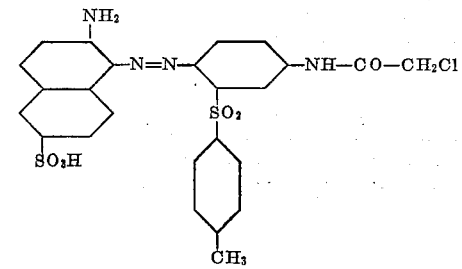

which dissolves in water, and dyes wool in an acid medium orange tints having very good properties of wet fastness and fastness to light.

*Example 3*

338.5 parts of 2-amino-5-chloroacetylamino-4'-methyl-1:1'-diphenyl sulfone are diazotized as described in Example 1. 253 parts of 2-N-methylamino-8-hydroxynaphthalene-6-sulfonic acid and 73 parts of sodium 1:3:6-naphthalene trisulfonate are suspended in 2800 parts of water at 60-70° C., and the mixture is neutralized with concentrated caustic soda solution until the reaction is very nearly acid to litmus. The solution is heated to 70-80° C. and is run, while stirring, into the diazo-suspension. The temperature of 30-35° C., which is attained after mixing the components, is maintained for 24 hours. A solution of 140 parts of crystalline sodium acetate in 300 parts of warm water, which has been rendered weakly acid to litmus with acetic acid, is very slowly added to the coupling mixture after the addition of the 2-N-methylamino-8-hydroxynaphthalene-6-sulfonic acid. When the coupling is finished about 200 parts of calcined sodium carbonate are added to the dyestuff suspension at room temperature until the reaction is weakly alkaline to Brilliant Yellow and filtered. The press cake so obtained is dried in vacuo at 50-60° C. There is obtained a blue-violet powder, which may be mixed with, for example, urea in order to improve its solubility. The dyestuff so obtained dyes wool from an acid medium red-violet tints of good fastness to washing and light.

*Example 4*

338.5 parts of 2-amino-5-chloracetylamino-4'-methyl-1:1'-diphenyl sulfone are diazotized as described in Example 1, and coupled with 267 parts of 2-N-ethylamino-8-hydroxynaphthalene-6-sulfonic acid in a manner analogous to that described in Example 3. There is obtained a blue-violet powder, to which, for example, urea may be added in order to improve its solubility. The dyestuff so obtained dyes wool from an acid medium red-violet tints of excellent fastness to washing and good fastness to light.

*Example 5*

383 parts of 2-amino-5-bromacetylamino-4'-methyl-1:1'-diphenyl sulfone are diazotized and coupled with 226 parts of 2-amino-8-hydroxynaphthalene-6-sulfonic acid exactly as described in Example 1. There is obtained a water-soluble dark red powder which dyes wool in an acid medium bluish red tints having good properties of wet fastness and fastness to light.

*Example 6*

352.5 parts of 2-amino-5-β-chloropropionylamino-4'-methyl-1:1'-diphenylsulfone are diazotized and coupled with 226 parts of 2-amino-8-hydroxynaphthalene-6-sulfonic acid in a manner analogous to that described in Example 1. There is obtained, as dark red powder, the dyestuff of the formula

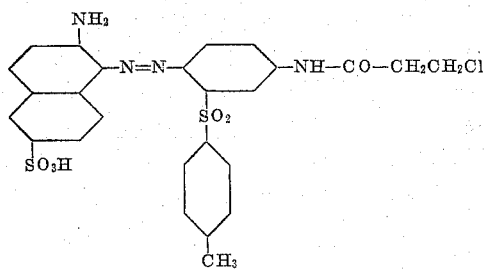

which dissolves in water and dyes wool in an acid medium bluish red tints having good properties of wet fastness and fastness to light.

*Example 7*

367.5 parts of 2-amino-5-chloracetylaminobenzene-1-sulfonic acid N-ethyl anilide are diazotized and coupled with 226 parts of 2-amino-8-hydroxynaphthalene-6-sulfonic acid exactly as described in Example 1. There is obtained a dark red powder which is the dyestuff of the formula

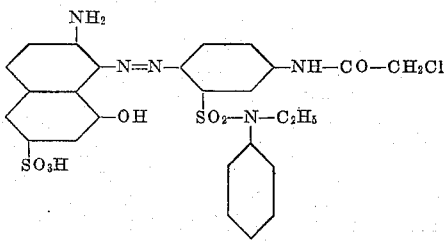

dissolves in water and dyes wool from an acid medium bluish red tints having good properties of wet fastness and a very good fastness to light.

The 2-amino-5-chloracetylaminobenzene-1-sulfonic acid N-ethyl anilide may be prepared, for example, as follows:

436 parts of 2:5-diaminobenzene-1-sulfonic acid N-ethyl anilide are dissolved in a mixture of 1200 parts of water and 900 parts of glacial acetic acid, and the solution is heated to 70-80° C. and filtered. The filtrate is cooled to 0° C. and 257 parts of chloracetic anhydride dissolved in 350 parts of ethyl acetate are added dropwise in the course of 30 minutes while stirring. The whole is stirred for a further ½ hour, and then cautiously neutralized in the course of a further ½ hour with 726 parts of sodium hydroxide dissolved in 1200 parts of water until the reaction is very nearly alkaline to Brilliant Yellow, care being taken that the temperature does not exceed 5° C. The mixture is then stirred for a further 2 hours, filtered, and the filter residue is washed with 4000 parts of water and dried in vacuo at 60-70° C. There are obtained 505 parts of a brownish powder, which contains 88-92 percent of 2-amino-5-chloracetylaminobenzene-1-sulfonic acid N-ethyl anilide. The purified product melts at 102-103° C.

*Example 8*

367.5 parts of 2-amino-5-chloracetylamino benzene-1-sulfonic acid N-ethyl analide are diazotized as described in Example 1, and then coupled with 253 parts of 2-N-methylamino-8-hydroxynaphthalene-6-sulfonic acid as described in Example 3. There is obtained a blue-violet powder, to which may be added, for example, urea, in order to improve its solubility. The dyestuff so obtained dyes wool from an acid medium violet tints of excellent fastness to washing and good fastness to light.

*Example 9*

2 parts of the dyestuff obtainable as described in Example 1 are dissolved in 4000 parts of water, 10 parts of crystalline sodium sulfate are added to the dyebath, and 100 parts of wool are entered at 40-50° C. There are then added 4 parts of acetic acid of 40 percent strength, the dyebath is raised to the boil in the course of ½ hour and dyeing is carried on for ¾ hour at that temperature. After rinsing the material and drying it, a bluish red fast dyeing is obtained.

Practically identical dyeings are obtained by using a bath containing about 3 percent of sulfuric acid or 3 percent of formic acid.

What is claimed is:

1. A monoazo dyestuff of the formula

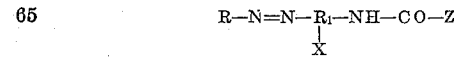

in which R represents the radical of a 2-aminonaphthalene-sulfonic acid bound in the 1-position to the azo linkage, $R_1$ represents a benzene radical, Z represents an alkyl radical which contains at most two carbon atoms and a member selected from the group consisting of a bromine and a chlorine atom in one of the positions α and ω and X represents a functionally converted sulfonic acid group.

2. A monoazo dyestuff of the formula

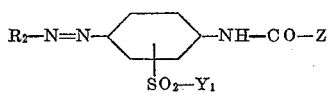

in which $R_2$ represents the radical of a 2-amino naphthalene monosulfonic acid bound in the 1-position to the azo linkage, $Y_1$ represents a benzene radical devoid of sulfonic acid and carboxylic acid groups and Z an alkyl radical which contains at most two carbon atoms and a member selected from the group consisting of a bromine and a chlorine atom in one of the positions $\alpha$ and $\omega$.

3. A monoazo dyestuff of the formula

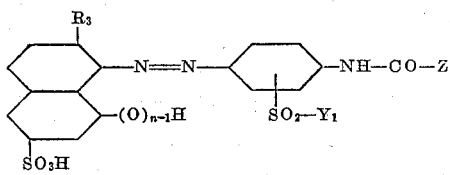

in which $R_3$ represents an amino group at most mono substituted by the group $C_pH_{2p+1}$, $p$ and $n$ representing a whole number not greater than 2, $Y_1$ representing a benzene radical devoid of sulfonic acid and carboxylic groups and Z an alkyl radical which contains at most two carbon atoms and a chlorine atom in one of the positions $\alpha$ and $\omega$.

4. A monoazo dyestuff of the formula

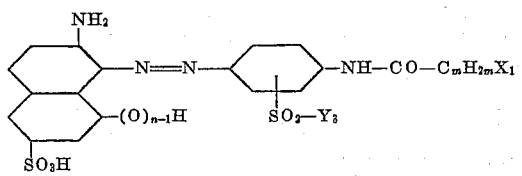

in which $n$ and $m$ represent each a whole number not greater than 2, $Y_3$ represents a benzene radical devoid of sulfonic acid and carboxylic acid groups and $X_1$ a chlorine atom in one of the positions $\alpha$ and $\omega$.

5. A monoazo dyestuff of the formula

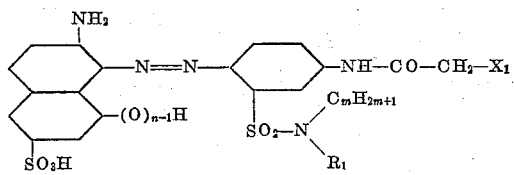

in which $n$ and $m$ each represents a whole number not greater than 2, $R_1$ represents a benzene radical devoid of sulfonic acid and carboxylic acid groups, and $X_1$ a chlorine atom.

6. A monoazo dyestuff of the formula

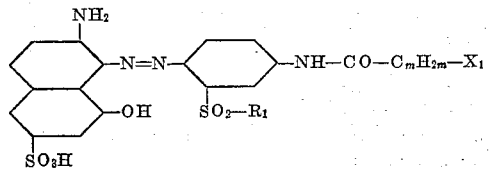

in which $R_1$ represents a benzene radical devoid of sulfonic acid and carboxylic acid groups and $m$ represents a whole number not greater than 2 and $X_1$ a chlorine atom.

7. The monoazo dyestuff of the formula

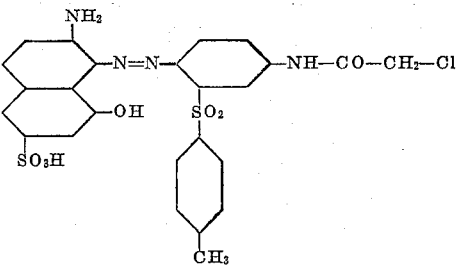

8. The monoazo dyestuff of the formula

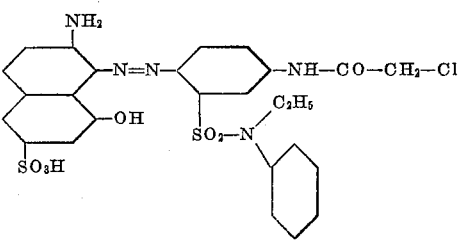

9. The monoazo dyestuff of the formula

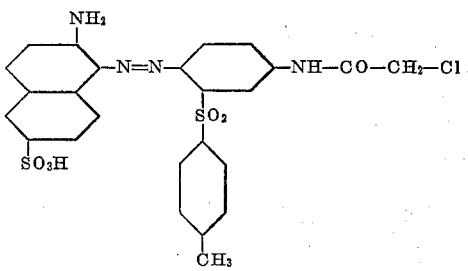

10. The monoazo dyestuff of the formula

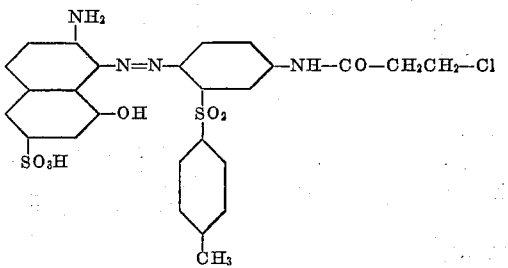

References Cited in the file of this patent

UNITED STATES PATENTS

| | | |
|---|---|---|
| 1,359,969 | Montmollin | Nov. 23, 1920 |
| 1,980,515 | Fischer | Nov. 13, 1934 |
| 2,374,157 | Kvalnes | Apr. 17, 1945 |
| 2,505,268 | Widmer et al. | Apr. 25, 1950 |
| 2,750,377 | Hindermann et al. | June 12, 1956 |